June 27, 1950 W. A. ROOVERS 2,512,971
METHOD OF FUSING TOGETHER GLASS PARTS
Filed Dec. 10, 1947
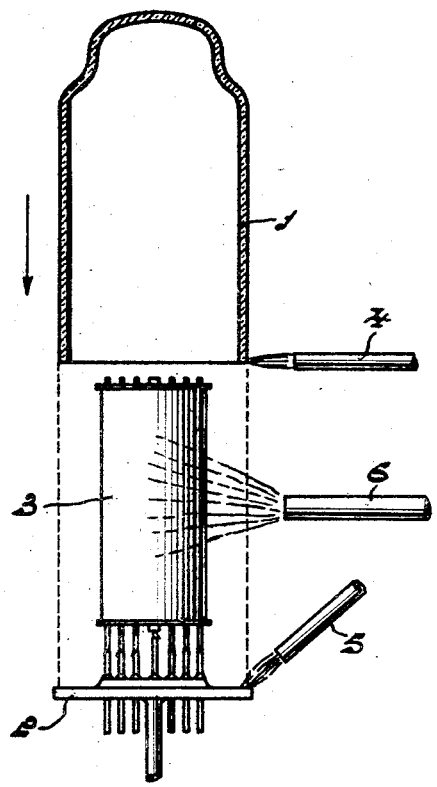
INVENTOR
WILHELMUS ANTONIUS ROOVERS
BY
*Fred A. Vogel*
AGENT Patented June 27, 1950

2,512,971

UNITED STATES PATENT OFFICE 2,512,971

METHOD OF FUSING TOGETHER GLASS PARTS

Wilhelmus Antonius Roovers, Eindhoven, Netherlands, assignor to Hartford National Bank and Trust Company, Hartford, Conn., as trustee Application December 10, 1947, Serial No. 790,801 In the Netherlands September 10, 1946

Section 1, Public Law 690, August 8, 1946 Patent expires September 10, 1966

6 Claims. (Cl. 49—82)

This invention relates to a method of fusing together glass parts, more particularly a bulb and a bottom for electric discharge tubes.

In many cases it is required to interconnect glass parts, of which at least one is hollow. In this hollow part elements are enclosed, for instance electrodes for a discharge tube which are sensitive to heat or to contact with the combustion gases of the flames by means of which the edges of the glass parts to be fused together are caused to melt. As a rule such glass parts, for instance bulb and bottom of an electric discharge tube, are superposed with the edges to be fused together in the cold state, the bulb being placed over the electrode system mounted on the bottom plate. Subsequently the superposed edges are generally heated by means of gas flames whilst rotating the glass parts until the edges become liquid and fuse together. This method suffers from the disadvantage that the edges which are in general not accurately processed do not yield a satisfactory closure on engaging each other in the cold state, so that the flames penetrate between the edges into the space containing the electrodes or other elements. Due to this the electrodes are subject to strong heating or may be attacked by the combustion gases, which causes many rejects. The heating operation might be effected with the help of high-frequency currents or by radiation from an incandescent metal ring, but in this case there is a great risk of excessive heating of the electrodes, since the operation occupies considerable time.

To obviate these difficulties the glass parts are often interconnected through the intermediary of an easily melting glaze. In this case, however, it is desirable that the edges to be interconnected should be flat and, moreover, the glaze should be composed and heated carefully to ensure a satisfactory vacuum-tight joint. Consequently, the use of such glaze is comparatively expensive.

According to the invention two glass parts can be satisfactorily fused together without experiencing the aforesaid disadvantages if, in a method of fusing together glass parts, of which at least one is hollow and which, after fusing together, enclose elements which are sensitive to heat or contact with the combustion gases of the flames, only the edges of the glass parts to be fused together are heated and rendered liquid superficially, these edges being so spaced apart that the said elements are for the greater part located outside the hollow glass part and the said edges, after becoming sufficiently liquid at the surface, being superposed and completely fused together. In an electric discharge tube wherein the bulb is required to be sealed to a bottom carrying the electrodes, the bulb and the bottom are positioned in such manner during the heating operation of the edges which are to be fused together that the spacing between the edges is such that the electrode-system is outside the bulb for the greater part. Owing to this it is avoided that the combustion gases of the flames directly contact with the electrode system and are enclosed in the bulb, since there is much space between bulb and base. In addition this permits the heat to be radiated from the bottom, so that the electrodes are only slightly heated by convection. Furthermore, it is possible for the combustion gases to be sucked off and, moreover, the electrodes may be cooled by means of a gas stream. To this end use is preferably made of a gas by which the electrodes are not attacked, for instance nitrogen which may be mixed with other gases. Moreover, the use of pointed flames permits the glass edges to be heated very locally at the surface. Subsequently bulb and base are swiftly brought together, the liquid edges of the glass directly sticking together in a manner such that on after-heating for fusing these edges completely together the combustion gases cannot penetrate into the bulb. Since the after-heating occupies comparatively little time, there is no risk of excessive heating of the electrodes. The method according to the invention is cheaper than the use of glaze, since the said edges need not be processed and the operations for providing the glaze are dispensed with. It has been found that the method according to the invention yields good results even for discharge tubes of minimum diameter.

In order that the invention may be clearly understood and readily carried into effect it will now be described more fully with reference to the accompanying drawing, given by way of example, which illustrates an example of the method according thereto.

The bulb 1 of an electric discharge tube is required to be fused to the base 2 which carries an electrode-system 3. The edges of bulb 1 and base 2 to be fused together are heated by means of burners 4 and 5 producing small pointed flames until the glass becomes liquid at the surface, the system 3 being cooled by means of a gas stream 6, whilst the combustion gases may be sucked off. The spacing between the edges to be fused together is such that the electrode-system is for the greater part, preferably entirely, outside the bulb 1. If desired, the bulb 1 might partly be placed over the system 3 but not to such an extent as to prevent cooling of the system, e. g. by means of a gas stream 6. Preferably, however, the spacing between the edges exceeds the height of the electrode-system.

When the glass of the edges of bulb and base has become sufficiently liquid the bulb is lowered and the edges are pressed together. These edges immediately stick together so that the combustion gases cannot penetrate into the bulb on after-heating the seal when the edges completely fuse together.

In the present case the example given concerns the fusing together of bulb and base of an electric discharge tube. It will be appreciated, however, that this method may be used whenever sensitive elements, e. g. members of certain materials or other articles sensitive to heat or contact with combustion gases are required to be enclosed in a space surrounded by glass parts which are required to be fused together.

What I claim is:

1. A method of manufacturing a device comprising an element sensitive to heat and combustion gases and a glass envelope enclosing said sensitive element, comprising the steps of mounting said element on a portion of said envelope, positioning in spaced relationship a complementary portion of said envelope, heating each of the glass portions at an edge thereof to liquify the said glass edges, while the said sensitive elements are substantially completely outside of the said complementary portion, moving said glass portions into contact at the said liquified edges, and heating the said contacting edges to fuse the said edges together to thereby enclose said element in said glass envelope.

2. A method of manufacturing a device comprising an element sensitive to heat and combustion gases and a glass envelope enclosing said sensitive element, comprising the steps of mounting said element on a portion of said envelope, positioning in spaced relationship a complementary portion of said envelope, heating each of the glass portions at an edge thereof with pointed flames to liquify the said glass edges, while the said sensitive elements are substantially completely outside of the said complementary portion, moving said glass portions into contact at the said liquified edges, and heating the said contacting edges to fuse the said edges together to thereby enclose said element in said glass envelope.

3. A method of manufacturing an electric discharge tube having glass bulb and glass base portions, which base has an electrode system sensitive to heat and combustion gases, and which system is to be enclosed by the said tube, comprising the steps of positioning the bulb and base portions in such spaced relationship that the sensitive electrode system lies substantially completely outside of the said bulb portion, heating each of the said glass bulb and base portions at an edge thereof with pointed flames to liquify the said glass at the said edges, moving the said bulb and base portions into contact at the said liquified edges, and heating the said contacting edges to fuse the said edges together to thereby enclose said sensitive electrode system in said tube.

4. A method of manufacturing an electric discharge tube having glass bulb and glass base portions and which base carries an electrode system sensitive to heat and combustion gases, and which system is to be enclosed by the said tube, comprising the steps of positioning the bulb and base portions in such spaced relationship that the spacing between the base portion and the bulb portion is substantially equal to the length of the said electrode system, heating each of the said glass bulb and base portions at an edge thereof with pointed flames to liquify the glass at the said edges, moving the said bulb and base portions into contact at the said liquified edges, and heating the said contacting edges to fuse the said edges together to thereby enclose said sensitive electrode system in said tube.

5. A method of manufacturing an electric discharge tube having glass bulb and glass base portions and which base carries an electrode system sensitive to heat and combustion gases, and which system is to be enclosed by the said tube, comprising the steps of positioning the bulb and base portions in such spaced relationship that the sensitive electrode system lies substantially completely outside of the said bulb portion, heating each of the said glass bulb and base portions at an edge thereof with pointed flames to liquify the said glass at the said edges, cooling the said electrode system by means of a gas stream during the heating of the said edges, moving the said bulb and base portions into contact at the said liquified edges, and heating the said contacting edges to fuse the said edges together to thereby enclose said sensitive electrode system in said tube.

6. A method of manufacturing an electric discharge tube having glass bulb and glass base portions and which base carries an electrode system sensitive to heat and combustion gases, and which system is to be enclosed by the said tube, comprising the steps of positioning the bulb and base portions in such spaced relationship that the sensitive electrode system lies substantially completely outside of the said bulb portion, heating each of the said glass bulb and base portions at an edge thereof with pointed flames to liquify the said glass at the said edges, cooling the said electrode system by means of a stream of nitrogen during the heating of the said edges, moving the said bulb and base portions into contact at the said liquified edges, and heating the said contacting edges to fuse the said edges together to thereby enclose said sensitive electrode system in said tube.

WILHELMUS ANTONIUS ROOVERS.

REFERENCES CITED

The following references are of record in the file of this patent:

UNITED STATES PATENTS

| Number | Name | Date |
|---|---|---|
| 2,006,568 | Gustin et al. | July 2, 1935 |
| 2,006,818 | Zimber | July 2, 1935 |
| 2,034,925 | Slayter et al. | Mar. 24, 1936 |
| 2,151,840 | Dichter | Mar. 28, 1939 |
| 2,215,641 | Freeman | Sept. 24, 1940 |
| 2,296,579 | Seelen | Sept. 22, 1942 |